United States Patent [19]
Nakabe et al.

[11] 3,708,614
[45] Jan. 2, 1973

[54] COLOR TELEVISION RECEIVER

[75] Inventors: Ryuhei Nakabe, Hirakata-shi; Fujisawa Hirakata, Osaka, both of Japan

[73] Assignee: Matsushita Electric Industrial Co., Ltd., Kodoma-shi, Osaka, Japan

[22] Filed: Oct. 9, 1970

[21] Appl. No.: 79,485

[30] Foreign Application Priority Data

Oct. 15, 1969 Japan ....................44/82830

[52] U.S. Cl. ....................178/5.4 HE
[51] Int. Cl. ....................H04n 9/12
[58] Field of Search ....................178/5.4, 5.4 HE

[56] References Cited

UNITED STATES PATENTS 3,525,802 8/1970 Whitener, Jr. ....................178/5.4 HE

*Primary Examiner*—Richard Murray
*Attorney*—Stevens, Davis, Miller & Mosher

[57] ABSTRACT

In a television receiver which receives color television signals including carrier chrominance signals, the passage of the carrier chrominance signals is controlled by means of a continuous subcarrier phase-shifted in a specified phase angle, the resulting signal is added to the subcarrier to partially phase-shift the subcarrier, and the signal thus obtained is used to demodulate the carrier chrominance signal, thereby to ensure the reproduction of a color signal corresponding to a specified hue.

8 Claims, 14 Drawing Figures

R. NAKABE
AND
S. FUJISAWA
INVENTORS

BY Stevens, Davis, Miller & Mosher
ATTORNEYS

COLOR TELEVISION RECEIVER

The present invention relates to a color television receiver in which errors in hue due to a differential phase distortion, etc. caused in a signal transmitting system are corrected in a better way.

The conventional NTSC type color television receiver is equipped with a hue control circuit for automatic hue control. However, the disadvantages of such a device is that variations in hue occur for the following various reasons:

a. A distortion of the differential phase, etc. in a transmitting system.
b. An error in camera adjustment.
c. An out-of-phase condition of a burst signal due to a reason attributable to a broadcasting station.
d. Phase characteristics of the receiver components including the antenna.
e. The out-of-phase condition of a subcarrier due to the temperature characteristics of a crystal, etc. in a receiver.

The present invention is aimed at obviating these disadvantages, and the above and other objects, features and advantages will be made apparent by the detailed description taken in conjunction with the accompanying drawings, in which.

Figure 6:
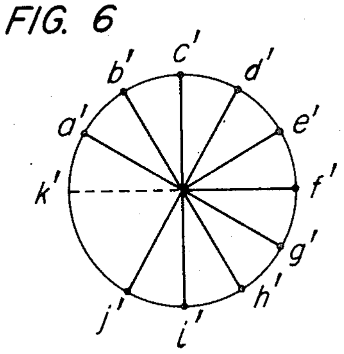
Figure 5:
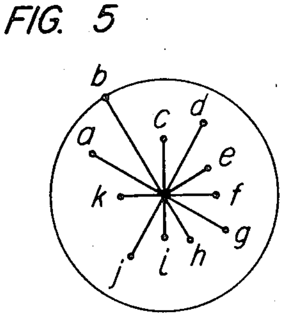
Figure 9:
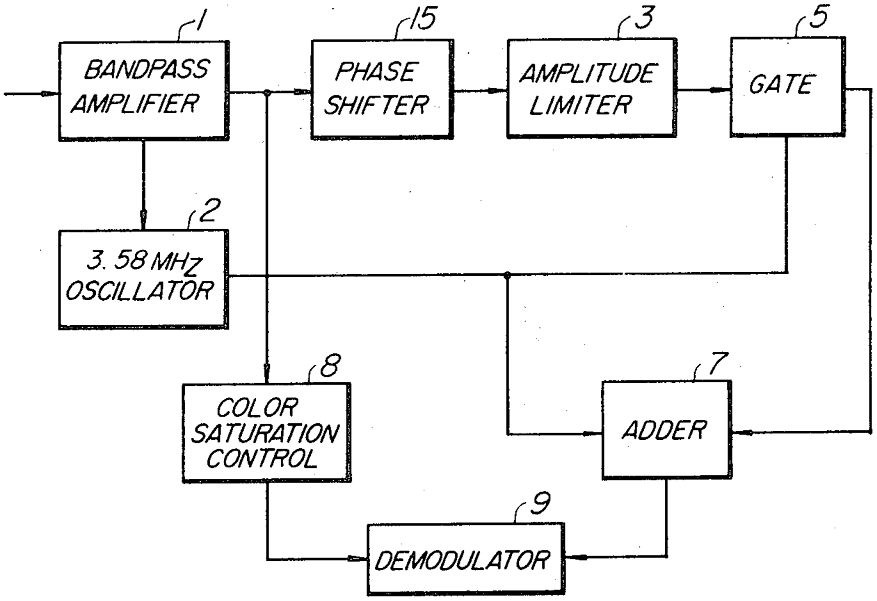

FIGS. *3a* to *3d* and 4 show waveforms for explaining the above-mentioned embodiment of the present invention;

FIGS. 5, 6, *7a*, *7b*, 8 and 10 show vectors for giving an explanation of the above-mentioned embodiment; and FIG. 9 is a block diagram showing another embodiment of the invention.

Figure 1:
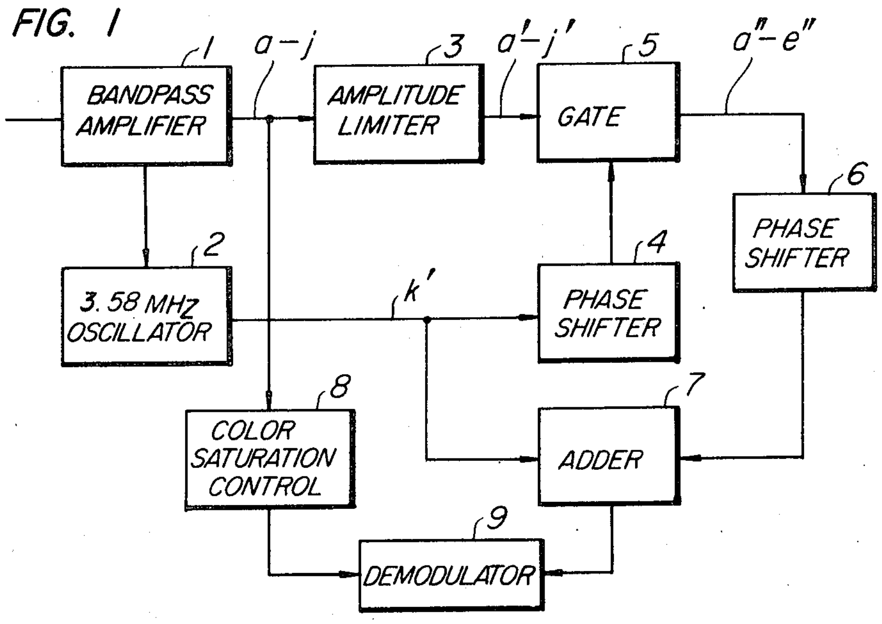
FIG. 1 shows a block diagram of a color television receiver embodying the present invention.

Referring now to FIG. 1, numeral 1 shows a bandpass amplifier of a receiver, numeral 2 a subcarrier oscillator, numeral 3 an amplitude limiter, numeral 4 a phase shifter, numeral 5 a gate circuit, numeral 6 a phase shifter, numeral 7 an adder, numeral 8 a color saturation control device, and numeral 9 a demodulator.

Figure 4:
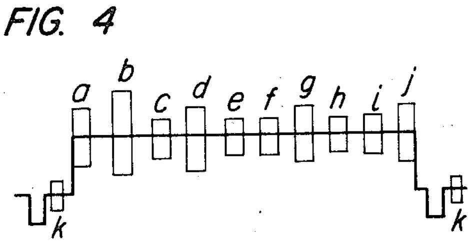

The operation of this circuit will be explained below. Assume that carrier chrominance signals *a* to *j* of various amplitudes as shown in FIG. 4 and which cover 300° at an angular interval of 30° starting from a burst signal *k* are applied to the input terminal of the bandpass amplifier 1. Then, at the output terminal of the bandpass amplifier 1 is produced amplified signals without any burst signal. By applying these signals to the amplitude limiter 3, carrier chrominance signals of a fixed amplitude are obtained. On the other hand, at the output terminal of the subcarrier oscillator 2 is obtained a subcarrier which is phase-controlled by an AFPC (Automatic Frequency Phase Control) circuit with a burst signal as a reference.

A vectorial relation between the above-described two signals is shown in FIG. 6, in which symbols *a'* to *j'* show the carrier chrominance signals limited in amplitude, the symbol *k'* showing a subcarrier from the subcarrier oscillator 2. Incidentally, even if the amplitude limiter 3 as shown in FIG. 1 is omitted, the effect of the present invention is very little affected, the advantage of inserting the amplitude limiter being that a certain amount of correction is always ensured irrespective of the amplitude of a carrier chrominance signal.

Figure 2:
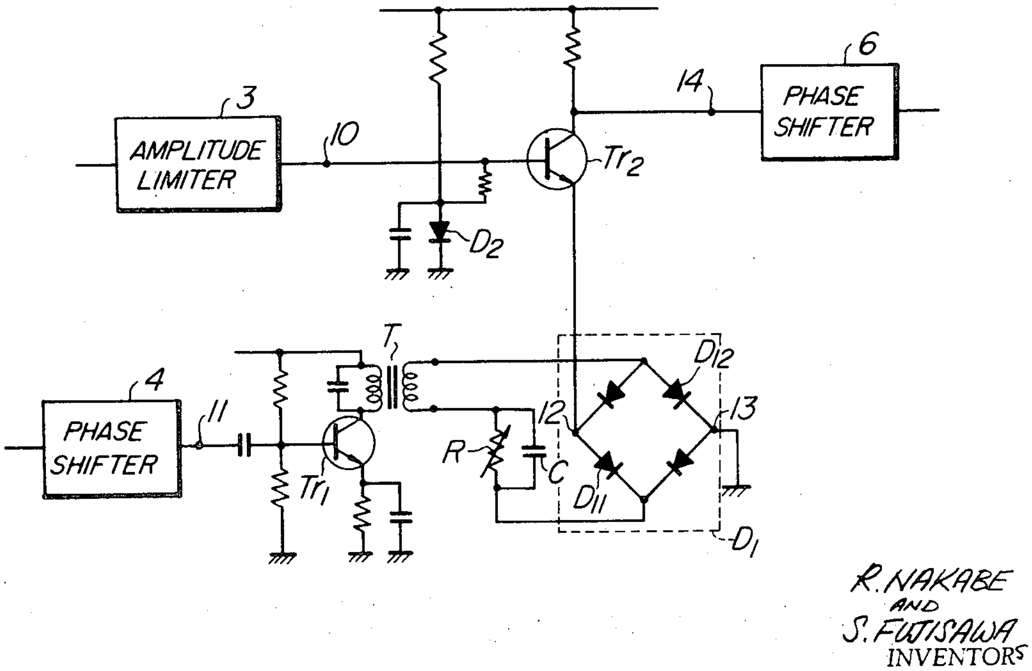
FIG. 2 is a diagram showing a detailed circuit of a part of the above-mentioned embodiment.
Figures 3A, 3B, 3C, 3D:
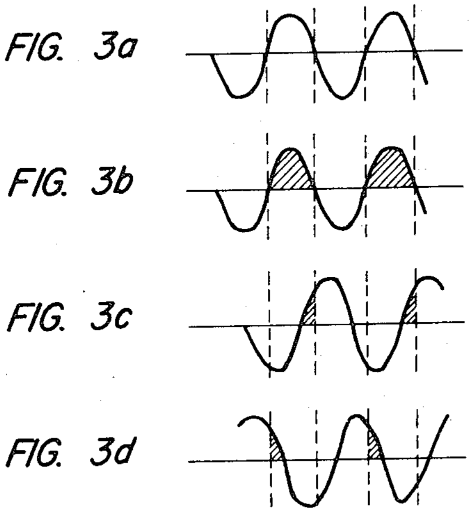

A detailed diagram of the gate circuit 5 employed in the present invention is shown in FIG. 2. The carrier chrominance signals *a'* to *j'* of a limited amplitude are applied to the terminal 10. A subcarrier set at an appropriate phase is applied from the phase shifter 4 to the terminal 11. This signal is applied to the transistor $Tr_1$ for amplification. And a current only in one direction flows in the secondary of the transformer T connected with the collector of said transistor, because of the bridge circuit $D_1$ of diodes. While this bridge circuit $D_1$ is conducting, points 12 and 13 are at the same potential and as a result the point 12 is at the earth potential. Between the bridge circuit $D_1$ and the transformer T, there is a parallel circuit of a variable resistor R and a capacitor C. By operating the variable resistor R, the electric charges stored in the capacitor C undergo a change, thereby to change the conduction angle of a subcarrier flowing in the diode bridge circuit $D_1$. The point 12 is connected to the emitter of the transistor $Tr_2$. Since a carrier chrominance signal is applied to the base of the transistor $Tr_2$, an output is produced at the collector of the transistor $Tr_2$ only when the diode circuit $D_1$ is conducting or said carrier chrominance signal is in phase with the phase-shifted subcarrier. Incidentally, a small amount of bias is applied to the base of the transistor $Tr_2$ by the diode $D_2$. Because of this diode $D_2$, it is possible to cut off the transistor $Tr_2$ when the terminal 12 is not at the earth potential. If a large bias is applied to the base of the transistor $Tr_2$ through a resistor, a current flows from the base of the transistor $Tr_2$ through the emitter thereof, diode $D_{11}$, resistor R, the secondary winding of the transformer T, diode $D_{12}$ to the earth, when the terminal 12 is not at the earth potential, thereby causing the transistor $Tr_2$ to be unnecessarily energized.

Assume that a subcarrier as shown in FIG. *3a* is applied to the secondary winding of the transformer T. Then, the bridge circuit $D_1$ is made to conduct during a positive half cycle, thereby making the transistor $Tr_2$ ready for conduction. At this time, if a carrier chrominance signal as shown in FIG. *3b* is applied to the terminal 10, the transistor $Tr_2$ conducts only during the periods represented by the shadowed portions. FIGS. *3c* and *3d* show the cases where the phase of the carrier chrominance signal is respectively behind and ahead of the subcarrier shown in FIG. *3a*. As can be seen from these drawings, the maximum output of the carrier chrominance signal is obtained when it is in phase with the subcarrier, the amplitude of the carrier chrominance signal becoming smaller as both signals are more out of phase. Also, by operating the resistor R, the phase width of the carrier chrominance signal which causes the conduction of the transistor $Tr_2$ can be determined.

Figure 7A:
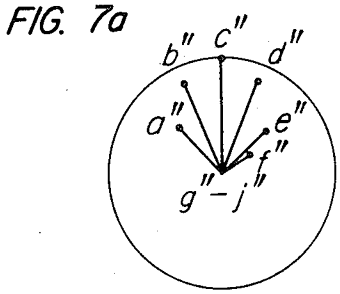
Figure 7B:
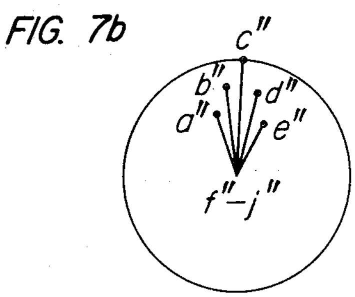

If the signal *k'* is phase-shifted by the phase shifter 4 in such a manner as to obtain the maximum amplitude of the signal *c'*, output signals as shown vectorially in FIG. 7 are produced. FIGS. *7a* and *7b* show the cases where the resistance value of the variable resistor R is made small and large respectively. In this fashion, the width of a hue to be corrected and the degree of correction can be controlled by adjusting the variable resistor R.

Figure 8:
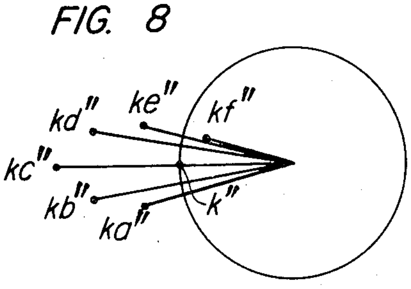
Figure 10:
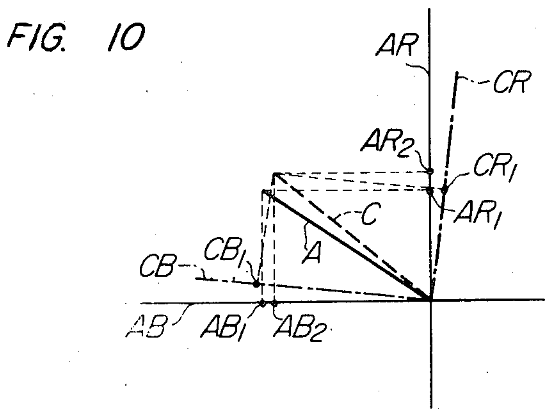

The output signals $a''$ to $f''$ thus obtained from the gate circuit 5 are phase-shifted by the phase shifter 6 in such a manner that the signal $c''$ is in phase with the signal $k'$, and applied to the adder 7. The resulting output which is a vectorial sum of the applied signals is shown in FIG. 8. When the outputs of signals $g''$ to $j''$ are produced from the gate circuit 5, the output of the adder 7 is $k''$. Similarly, when the gate outputs are $a''$, $b''$, $c''$, $d''$, $e''$ and $f''$, the outputs of the adder 7 are $ka''$, $kb''$, $kc''$, $kd''$, $ke''$ and $kf''$, respectively. These signals are applied to the demodulator 9 as a subcarrier, and a carrier chrominance signal is applied to the other input terminal of the demodulator 9 through the color saturation control device 8. As a result, the phases of the color signals appearing at the output terminal of the demodulator 9 as demodulated signals are concentrated around that of the carrier chrominance signal $c$. Referring to FIG. 10, if the vector A representing a signal of a right phase is demodulated by the two axes AR and AB at right angles to each other, the outputs $AR_1$ and $AB_1$ are obtained. However, if the vector A is shifted to the position as shown by the vector $c$ for some reason, the demodulated outputs are $AB_2$ and $AR_2$ in the conventional device which uses the axes AB and AR for demodulation. As a result, the output on axis AB is reduced, while that on axis AR is increased, causing an error in hue. The device of the present invention, by contrast, uses the axes CB and CR in such a case, and hence the outputs are $CB_1$ and $CR_1$ which are almost equal to $AB_1$ and $AR_1$. Generally, the output of a carrier-balance type demodulator is not affected by a variation in the amplitude of a subcarrier, if the amplitude of such a subcarrier is set sufficiently large.

As is clear from the foregoing description, if the phase shifter 4 is controlled in such a manner as to render the flesh tint signal the largest among the carrier chrominance signals from the gate circuit 5, hues around the flesh tint are concentrated to produce the flesh tint signal at the output terminal of the demodulator 9. By presetting a hue control of a receiver in the above-mentioned way, no problem arises as far as the flesh tint which is often subject to viewer's criticism, even when hues are somewhat shifted.

It will be understood from the above that, according to the present invention, no special adjustment of a hue control is needed to obtain an appropriate color saturation of the flesh tint which a viewer is most critical of, since hues around the flesh tint are concentrated as explained earlier.

Another embodiment shown in FIG. 9 uses, instead of the phase shifters 4 and 6 as shown in FIG. 1, a phase shifter 15 between the bandpass amplifier 1 and the amplitude limiter 3, and it operates in a similar way as the embodiment shown in FIG. 1. In the embodiment of FIG. 1, the signal $k$ as shown in FIG. 5 is phase-shifted to the position c by the phase shifter 4 and subsequently shifted back to the original position by the phase shifter 6. In the embodiment of FIG. 10, by contrast, the signal $c$ is first shifted to the position $k$ by the phase shifter 15, thus eliminating the need for two phase shifters.

What is claimed is:

1. A color television receiver, comprising:

amplifying means for amplifying a carrier chrominance signal;

subcarrier generating means for generating a continuous subcarrier to demodulate said carrier chrominance signal;

gate circuit means having a first signal corresponding to said carrier chrominance signal as a first input signal and a second signal corresponding to said subcarrier as a second input signal, the output of said gate circuit means increasing as the phase difference between said first and second input signals decreases and decreasing as the phase difference between said first and second input signals increases, the phase of said output increasing in correspondence with the increasing phase difference between said first and second input signals;

phase shifting means for shifting the phase of said subcarrier to maintain a predetermined phase relation between said carrier chrominance signal and said subcarrier for a specific hue signal before being applied to said gate circuit means;

adding means for adding the output of said gate circuit means to the output of said subcarrier generating means; and demodulating means for demodulating said carrier chrominance signal by the output of said adding means, said carrier chrominance signal being applied to said demodulating means without any change of phase.

2. A color television receiver according to claim 1, in which an amplitude limiter is inserted between said amplifying means and said gate circuit means.

3. A color television receiver according to claim 1, wherein said phase shifting means is connected between said amplifying means and said gate circuit means to correspond the phase of a signal corresponding to said specific hue signal to the phase of said subcarrier.

4. A color television receiver according to claim 1, wherein said gate circuit means comprises: a transistor having base, emitter and collector electrodes, the carrier chrominance signal from the output of said amplifying means being applied to said base electrode as an input signal, an output signal appearing at said collector electrode; a bridge rectifier comprising four diodes, said emitter electrode being connected to the anode-cathode junction of one pair of said diodes, the anodecathode junction of a second pair of said diodes being connected to ground; and further comprising means for applying the phase shifted subcarrier from the output of said phase shifting means across the anode-cathode junctions of third and fourth pairs of said diodes.

5. A color television receiver according to claim 4, in which said subcarrier is applied to said rectifier through a parallel circuit comprising a resistor and a capacitor.

6. A color television receiver according to claim 4, further comprising means for applying a constant bias to said base electrode for maintaining said transistor in a conductive state when said carrier chrominance signal is applied to said transistor when said bridge rectifier is in a conductive state and for maintaining said transistor in a non-conductive state when said carrier chrominance signal is absent from said transistor in the conductive state of said bridge rectifier.

7. A color television receiver according to claim 1, wherein the phase of said specific hue signal is the phase of said carrier chrominance signal corresponding to flesh tint.

8. A color television receiver, comprising:

amplifying means for amplifying a carrier chrominance signal;

subcarrier generating means for generating a continuous subcarrier to demodulate said carrier chrominance signal;

gate circuit means having a first signal corresponding to said carrier chrominance signal as a first input signal and a second signal corresponding to said subcarrier as a second input signal, the output of said gate circuit means increasing as the phase difference between said first and second input signals decreases and decreasing as the phase difference between said first and second input signals increases, the phase of said output increasing in correspondence with the increasing phase difference between said first and second input signals;

first phase shifting means connected between said subcarrier generating means and said gate circuit means for shifting the phase of said subcarrier to maintain a predetermined phase relation between said carrier chrominance signal and said subcarrier for a specific hue signal before being applied to said gate circuit means;

second phase shifting means for shifting the phase of the output of said gate circuit means so that the phase of a maximum output of said gate circuit means corresponding to the phase said specific hue signal corresponds with the phase of said subcarrier;

adding means for adding the output of said second phase shifting means to the output of said subcarrier generating means; and demodulating means for demodulating said carrier chrominance signal by the output of said adding means.

* * * * *